UNITED STATES PATENT OFFICE.

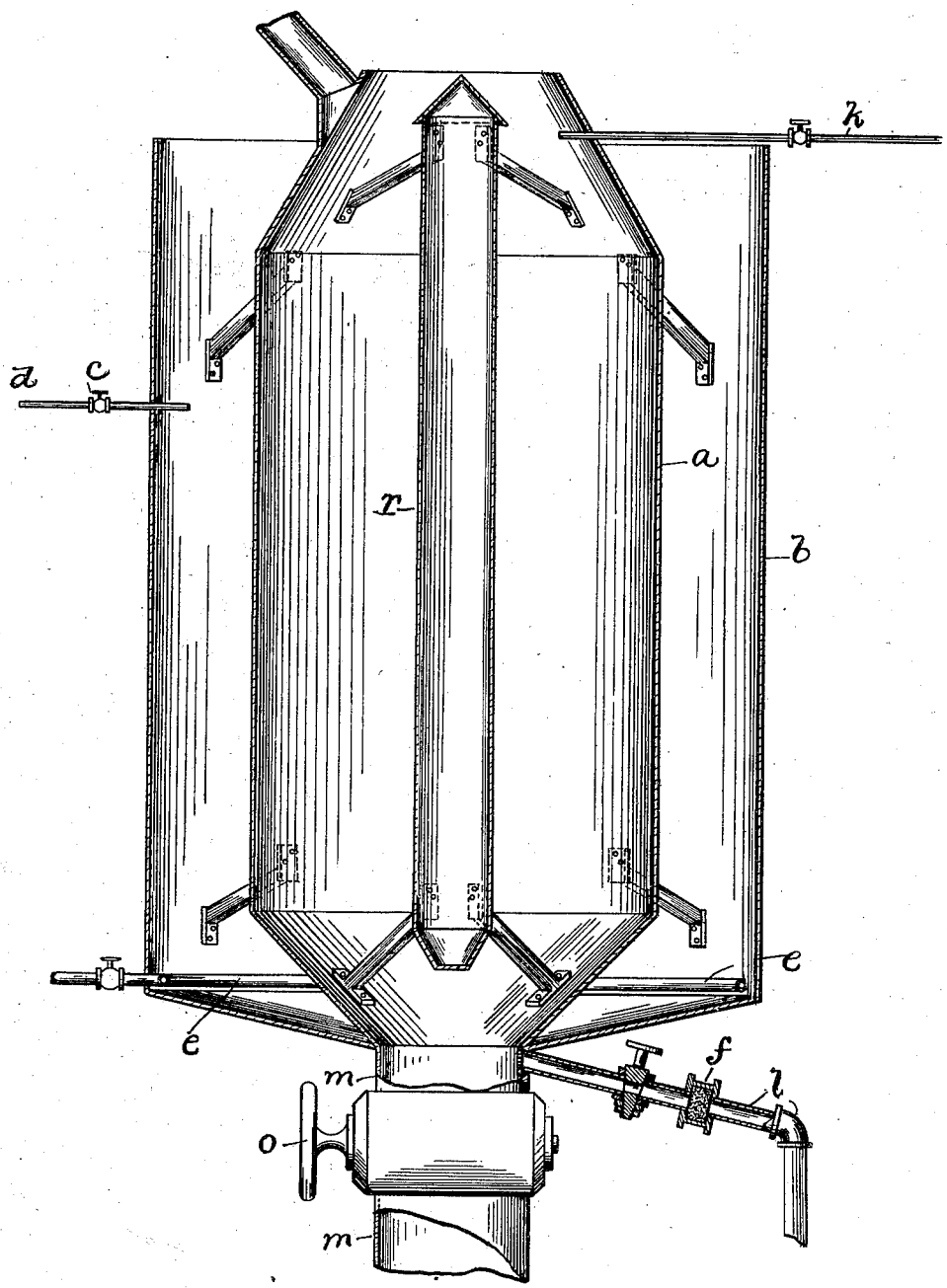

EUGENE R. EDSON, OF CLEVELAND, OHIO, ASSIGNOR TO THE BUCKEYE FISH COMPANY, OF SAME PLACE.

PROCESS OF MAKING GELATIN.

SPECIFICATION forming part of Letters Patent No. 662,402, dated November 27, 1900.

Application filed October 30, 1899. Serial No. 735,275. (No specimens.)

*To all whom it may concern:*

Be it known that I, EUGENE R. EDSON, a resident of Cleveland, county of Cuyahoga, and State of Ohio, have invented certain new and useful Improvements in Producing Isinglass or Gelatin from Fish-Scales, &c.; and I do hereby declare the following to be a full, clear, and exact description of the invention, such as will enable others skilled in the art to which it pertains to make and use the same.

This invention relates to an improved process of producing isinglass or gelatin from gelatigenous and oilless parts of fish—such, for instance, as fish-scales, fish-sounds, and fish-bladders—and from other material that contains a gelatin-producible substance.

The primary object of this invention is to obtain isinglass or substantially pure gelatin from fish-scales and other oilless or substantially oilless parts of fish and to avoid the destruction of the gelatinizing property of any of the material undergoing treatment, so as to result in obtaining the largest possible amount of gelatin from the quantity of material undergoing treatment.

With this object in view the invention consists in improvements hereinafter described, and pointed out in the claims.

The scales or material to be treated is first washed or cleaned in any approved manner to remove slime and other foreign matter deposited or formed thereon. The material, if it is hard and coarse—as, for instance, the fins and tails of fish—is crushed or reduced into a finely-divided or suitable state. The material having been washed or cleaned or prepared as hereinbefore described is treated with pure or substantially pure water, preferably previously boiled and distilled water at a comparatively high temperature, but below 212° Fahrenheit, long enough to extract the gelatin-producible substance from the material being treated. The treatment of the material with the water at a temperature of about 200° Fahrenheit has yielded very satisfactory results. A somewhat tedious and long treatment of the material at a temperature as low as 130° Fahrenheit was attended with fairly good results, and although 130° is not considered a low temperature a temperature as high as 200° Fahrenheit is more practical and efficient. Any sufficiently high temperature lower than 212° Fahrenheit will suffice; but the mass should not be boiled or exposed to a temperature above 212° Fahrenheit, because a boiling temperature will destroy or materially injure the gelatinizing property of the substance that is contained in the material and that is convertible into isinglass or gelatin. Preferably the receptacle in which the material is to be treated is filled almost completely with the material, and thereupon hot water, preferably previously boiled and distilled water, is poured over the material, and the receptacle and contents are heated in any approved manner the requisite length of time to effect the extraction of the gelatin-forming substance from the material undergoing treatment and the saturation of the water with the said substance. Very desirable results have been attained by treating fish-scales, fish-sounds, and fish-bladders and added water with heat for a period of one hour and thirty minutes; but the temperature of the mass during the treatment of the latter with heat should not be permitted to rise to the boiling-point. Very desirable results have also been attained by treating finely-divided fish-fins and fish-tails with water at the aforesaid temperature for several hours. In every instance the material undergoing treatment and the added water are kept heated long enough to permit the solvent-constituting water to dissolve enough of the gelatin-forming substance to render the resulting gelatin solution capable of congealing upon its subjection after its removal from the heater to a sufficiently low temperature.

The gelatin solution is drawn or removed from the heated mass in any approved manner and is filtered to remove all traces of solid matter or foreign matter that may have been drawn off with the solution, and the filtered liquid is then subjected to a temperature low enough to congeal the same, and the subjection of the liquid to a temperature lower than 50° Fahrenheit is important, and the exposure of the filtered liquid to a temperature of from 33° to 44° Fahrenheit is found very suitable for the purpose. The liquid must not, however, be subjected to a temperature at or below the freezing-point, because a temperature as low as this would disintegrate the congealing liquid. When the liquid has been subjected to a desirably low temperature long enough to become set or jellied or rendered sliceable, the resulting body of isinglass or gelatin is cut into very thin marketable slices, that are dried in any approved manner and maintained at a temperature low enough to avoid molding of the gelatin and to prevent the reconversion of the slices of gelatin into a liquid state—that is, any water or moisture contained in the slices is removed, preferably by evaporation and preferably at a temperature of about 40° Fahrenheit. The slices of gelatin would become liquefied upon their exposure to a temperature above 50° Fahrenheit before removing any remaining traces of the solvent therefrom. The maintenance of the slices at a temperature above the freezing-point, but not high enough to reconvert the gelatin into a liquid state during the drying of the slices, is of vast importance.

The material remaining in the heated receptacle after drawing off the gelatin solution therefrom, as hereinbefore described, is preferably subjected to another treatment with water at a high temperature lower than 212° Fahrenheit, and preferably at about 200° Fahrenheit, to extract any gelatin-forming substance still remaining in the material, and the resulting liquid or gelatin solution is purified, solidified or set, sliced, and dried in the manner already described in connection with the first run of gelatin solution from the material.

The accompanying drawing is a side elevation, largely in section, of apparatus suitable for employment in the treatment of the gelatin-yieldable material with the solvent-constituting water. The said apparatus comprises a receptacle $a$, in which the material requiring treatment is introduced. The receptacle $a$ is supported centrally within a tank or container $b$, that is supplied with water by opening the valve $c$ of the water-supply pipe $d$, that is arranged to discharge into the tank $b$. When the tank $b$ has been filled or approximately filled with water, the valve $c$ is closed, and thereupon the heating steam-coil $e$ within the lower portion of the said tank is operated until the water in the tank boils. The water in the container is maintained in a boiling condition during the treatment of the material within the receptacle $a$. The desired level of water within the tank is maintained by so regulating the valve $c$ of the pipe $d$ that as much water will continuously flow into the tank as is evaporated therefrom. The water thus supplied to the tank $b$ is preferably already in a warm or heated condition, being previously heated in any approved manner.

The solvent-constituting water is preferably previously boiled or distilled water and is supplied, preferably in a hot or warm condition, to the chamber of the receptacle $a$ by the valved pipe $k$, that discharges into the upper end of the said receptacle.

The gelatin solution is drained from the receptacle $a$ by means of a valved drain-pipe $l$, that leads from the said receptacle at a point above and in close proximity to the valve $o$, with which the receptacle's outlet $m$, at which the residue is discharged, is provided, and in the line of the pipe $l$ is located a filter $f$, so that the gelatin solution is purified in its passage through the said filter.

The material undergoing treatment within the receptacle $a$ is prevented from caking centrally of the said receptacle by means of a core $r$, arranged vertically and centrally within and supported by the said receptacle.

The apparatus disclosed in this application forms a portion of the subject-matter disclosed and claimed in copending application Serial No. 736,401.

What is claimed is as follows:

1. The process herein described, comprising the treatment of material of the character indicated with water at the temperature required to extract isinglass or gelatin from the material without destroying the congealableness of the resulting solution; then subjecting the said solution to a temperature low enough to congeal the same; then slicing the congealed mass, and, lastly, drying the resulting slices and exposing the latter, during the drying period, to a temperature low enough to prevent liquefying or molding of the slices, substantially as and for the purpose set forth.

2. An improvement in the treatment of material of the character indicated to produce isinglass or gelatin, comprising a treatment of the material with water at the temperature required to extract gelatin-forming substance from the material without destroying the subsequent congealableness of the said gelatin-forming substance; then filtering the solution obtained before its reduction to a temperature low enough to congeal the same, and, after filtration, subjecting the filtered liquid to a temperature low enough to sufficiently congeal the same, to render it capable of being sliced, and then drying the resulting slices at the aforesaid lower temperature, substantially as and for the purpose set forth.

3. The process herein described, consisting in treating material of the character indicated with water at a suitably high temperature lower than 212° Fahrenheit and maintaining the mass properly heated at a temperature below the boiling-point until enough gelatin has been dissolved to form a solution of the consistency required to render it congealable by subjecting it to a sufficiently low temperature; then subjecting the solution to a suitable temperature lower than 50° Fahrenheit, and when the solution has congealed into a sliceable state then converting the congealed mass into thin slices, and lastly drying the resulting slices at the aforesaid temperature, substantially as and for the purpose set forth.

Signed by me at Cleveland, Ohio, this 23d day of October, 1899.

EUGENE R. EDSON.

Witnesses:
C. H. DORER,
A. H. PARRATT.